United States Patent
Göransson

(10) Patent No.: US 10,274,207 B2
(45) Date of Patent: Apr. 30, 2019

(54) HEATING INSTALLATION

(71) Applicant: Energy Machines S.A., Luxembourg (LU)

(72) Inventor: Hans-Göran Göransson, Sliema (MT)

(73) Assignee: Energy Machines ApS, Faaborg (DK)

( * ) Notice: Subject to any disclaimer, the term of this patent is extended or adjusted under 35 U.S.C. 154(b) by 432 days.

(21) Appl. No.: 14/891,196

(22) PCT Filed: May 13, 2014

(86) PCT No.: PCT/EP2014/059748
§ 371 (c)(1),
(2) Date: Nov. 13, 2015

(87) PCT Pub. No.: WO2014/184184
PCT Pub. Date: Nov. 20, 2014

(65) Prior Publication Data
US 2016/0116172 A1 Apr. 28, 2016

(30) Foreign Application Priority Data

May 14, 2013 (SE) .................................... 1350587-0

(51) Int. Cl.
| | | |
|---|---|---|
| *F25B 27/00* | (2006.01) | |
| *F24D 3/18* | (2006.01) | |
| *F24D 3/08* | (2006.01) | |

(52) U.S. Cl.
CPC ............... *F24D 3/18* (2013.01); *F24D 3/087* (2013.01); *F24D 2200/123* (2013.01)

(58) Field of Classification Search
CPC ...... F24D 2200/123; F24D 3/087; F24D 3/18; F24D 17/0089; F25B 2313/021; F24F 5/0096; F24F 2221/18
See application file for complete search history.

(56) References Cited

U.S. PATENT DOCUMENTS

| | | | | |
|---|---|---|---|---|
| 5,304,286 A | * | 4/1994 | Palmer | ...................... C02F 1/16 165/110 |
| 2007/0221362 A1 | * | 9/2007 | Stewart | ...................... A61L 2/04 165/57 |
| 2008/0196431 A1 | * | 8/2008 | Goransson | ................ F24D 3/18 62/238.6 |

FOREIGN PATENT DOCUMENTS

| | | |
|---|---|---|
| DE | 10 2007 025121 A1 | 12/2007 |
| EP | 2 407 734 A1 | 1/2012 |

(Continued)

*Primary Examiner* — Ned Landrum
*Assistant Examiner* — Melodee Jefferson
(74) *Attorney, Agent, or Firm* — Dilworth & Barrese, LLP

(57) ABSTRACT

A heating installation comprising: —a first circuit (C1); —a second circuit (C2); —a first heat pump (4) for heating the medium in the first circuit; —a first heat exchanger (10) arranged in the second circuit (C2) and connected between a condenser (4b) and an expansion valve (4d) of the first heat pump; —a second heat pump (11) arranged for heating a medium by absorbing heat energy from the medium in the second circuit; and —a second heat exchanger (12) and a third heat exchanger (14) for transferring heat from the medium in the second circuit to water in a water supply line (13). The second heat exchanger (12) is connected to the water supply line upstream of the third heat exchanger (14) in order to allow the second heat exchanger to preheat the tap hot-water in a first step and the third heat exchanger to preheat the tap hot-water in a subsequent second step.

20 Claims, 5 Drawing Sheets

(56) References Cited

FOREIGN PATENT DOCUMENTS

EP         0 056 780 A2    7/2012
WO    2006/057594 A1    6/2006

* cited by examiner

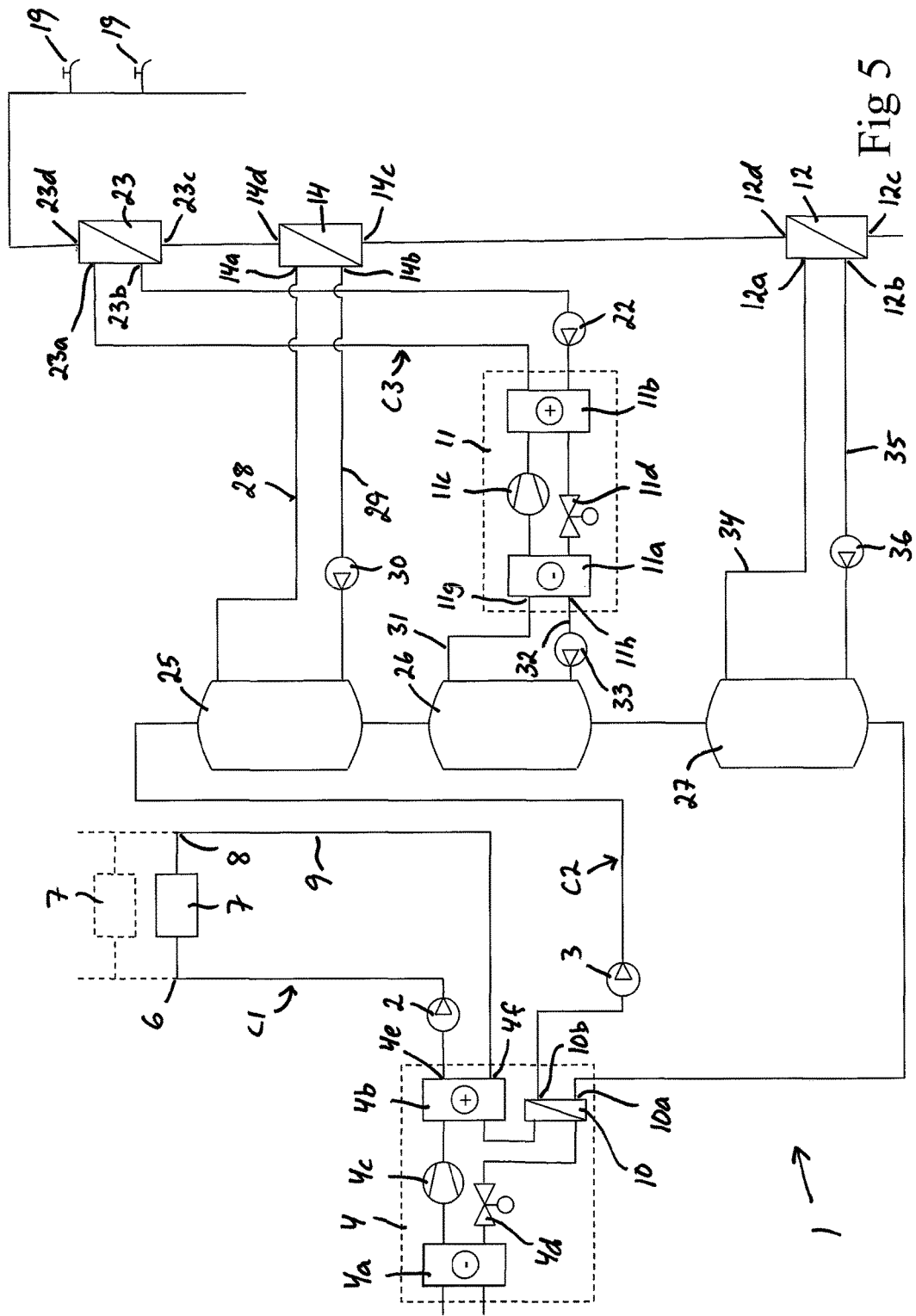

HEATING INSTALLATION

FIELD OF THE INVENTION AND PRIOR ART

The present invention relates to a heating installation according to the description herein.

A heating installation according to the preamble of claim 1 is previously known from the patent document WO 2006/057594 A1. The heating installation disclosed in WO 2006/057594 A1 comprises a first heat pump for heating a medium in a first circuit. A heat exchanger connected between the condenser and the expansion valve of the first heat pump is used for transferring heat from the working medium of the heat pump to a medium in a second circuit, a second heat pump being arranged for heating a medium in a third circuit by absorbing heat energy from the medium in the second circuit. The medium in the third circuit may be water that is intended to be heated in order to provide tap hot-water, in which case said heating by means of the second heat pump constitutes a final heating step in a process for heating tap hot-water to a desired temperature, i.e. a final heating of the tap hot-water. In WO 2006/057594 A1 an embodiment is disclosed where a second heat exchanger is arranged in the second circuit in series with the first heat exchanger in order to transfer heat from the medium in the second circuit to the medium in the third circuit, wherein this heat transfer may constitute a first initial heating step in a process for heating tap hot-water, i.e. a preheating of the tap hot-water.

OBJECT OF THE INVENTION

The object of the present invention is to achieve a further development of a heating installation of the type described above in order to provide a heating installation with a configuration which in at least some aspect offers an advantage as compared to this previously known heating installation.

SUMMARY OF THE INVENTION

According to the invention, said object is achieved by a heating installation having the features defined herein.

The heating installation according to the invention comprises:
- a first circuit containing a medium;
- a second circuit containing a medium;
- a first heat pump arranged for heating the medium in the first circuit;
- a first heat exchanger which is arranged in the second circuit and which is connected between a condenser and an expansion valve of the first heat pump in order to transfer heat from a working medium of the first heat pump to the medium in the second circuit;
- a second heat pump arranged for heating a medium by absorbing heat energy from the medium in the second circuit;
- a second heat exchanger which is arranged in the second circuit in order to transfer heat from the medium in the second circuit to water in a water supply line that is intended to be heated in order to provide tap hot-water, this second heat exchanger being connected to the second circuit downstream of the second heat pump as seen in a flow direction from an outlet of the first heat exchanger to an inlet of the first heat exchanger; and
- a third heat exchanger which is arranged in the second circuit in order to transfer heat from the medium in the second circuit to the water in said water supply line, this third heat exchanger being connected to the second circuit upstream of the second heat pump as seen in said flow direction.

Said second and third heat exchangers are arranged in series with each other in said water supply line, the second heat exchanger being connected to the water supply line upstream of the third heat exchanger to thereby allow the second heat exchanger to preheat the tap hot-water in a first step and the third heat exchanger to preheat the tap hot-water in a subsequent second step.

The first heat exchanger constitutes a so-called subcooler of the first heat pump and is used in order to transfer heat from the working medium of the first heat pump to the medium in the second circuit, wherein the second heat pump is arranged to utilize heat energy from the medium in the second circuit in order to satisfy a heating demand. Hereby, surplus heat of the working medium of the first heat pump may be utilized for heating tap hot-water and other suitable heating purposes instead of being wasted and an increase of the efficiency of the first heat pump is obtained. By arranging a heat exchanger in the second circuit upstream of the second heat pump and another heat exchanger in the second circuit downstream of the second pump and using these heat exchangers in order to preheat the tap hot-water in two successive steps, a very efficient utilization of the heat energy of the medium in the second circuit is achieved. With this solution, it will be possible to utilize low-grade heat energy of the medium in the second circuit downstream of the second heat pump in order to achieve, via said second heat exchanger, an initial temperature increase of the water that is to be heated in order to provide tap hot-water, and to utilize high-grade heat energy of the medium in the second circuit upstream of the second heat pump in order to achieve, via said third heat exchanger, a further temperature increase of said water. Hereby, the medium in the second circuit may be utilized for an efficient preheating of tap hot-water via the third heat exchanger before this medium has lost a part of its heat energy content to the second heat pump. The third heat exchanger, the second heat pump and the second heat exchanger co-operates in absorbing heat energy from the medium in the second circuit in three successive steps and will thereby make possible an efficient cooling of the medium in the second circuit, which in its turn makes it possible for the first heat exchanger to achieve an efficient subcooling of the working medium of the first heat pump.

According to an embodiment of the invention, the second heat pump is arranged to emit heat energy for final heating of the tap hot-water.

According to another embodiment of the invention, at least one accumulator tank is arranged in the second circuit for accumulating the medium in the second circuit. By means of this accumulator tank, a larger amount of heated medium may be kept available in the second circuit, and a desired preheating of tap hot-water in connection with occasional peaks in the hot water demand may be taken care of by means of the heat energy of the medium stored in the accumulator tank. With this solution it will also be possible to heat tap hot-water by utilizing the heat energy of the medium in the second circuit even in situations when the first heat pump is temporarily out of operation.

Other favorable features of the heating installation according to the invention will appear from the dependent claims and the description following below.

BRIEF DESCRIPTION OF THE DRAWINGS

The invention will in the following be more closely described by means of embodiment examples, with reference to the appended drawings. It is shown in.

DETAILED DESCRIPTION OF EMBODIMENTS OF THE INVENTION

Figure 1:
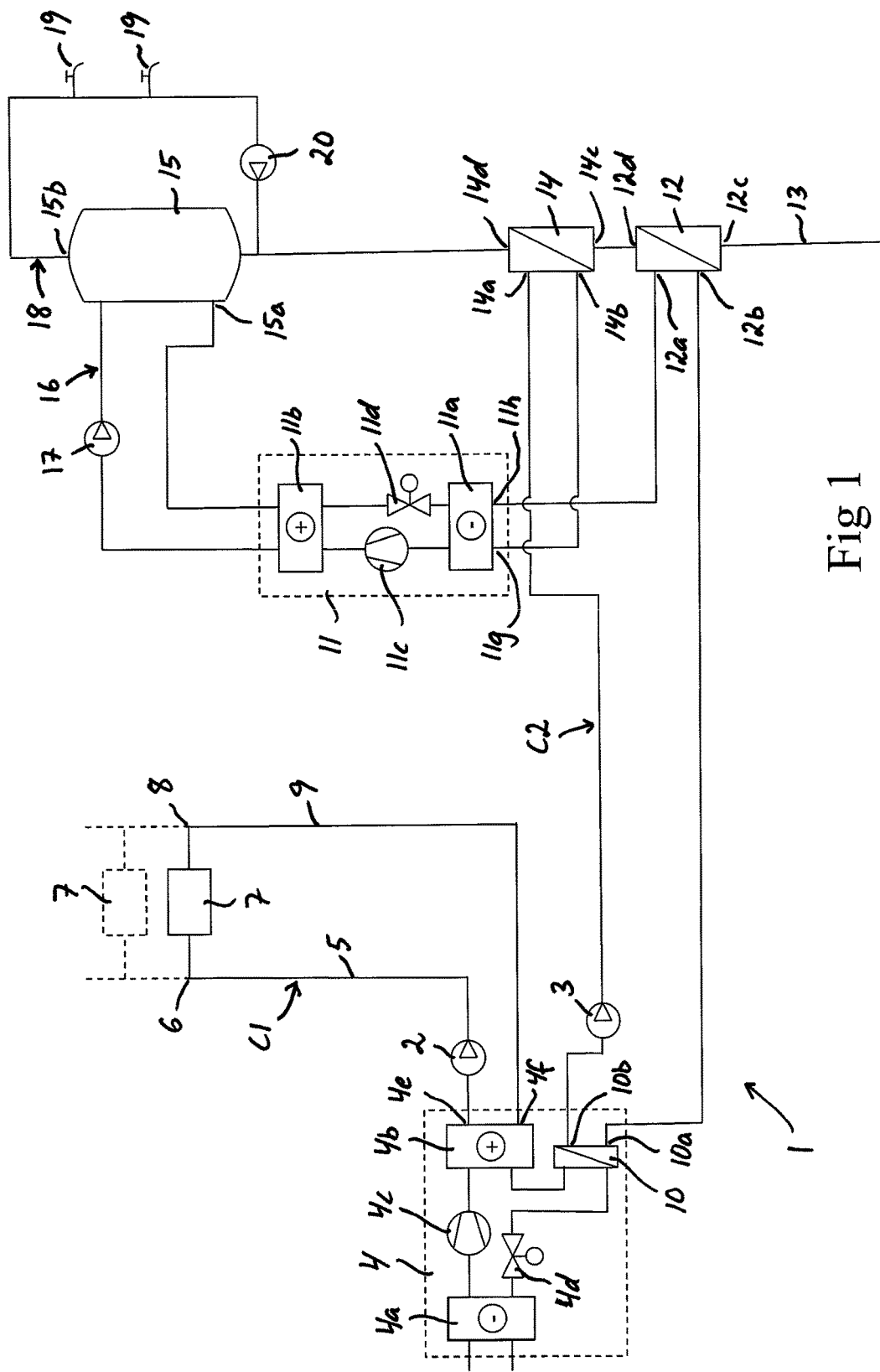
FIG. 1 a schematic illustration of a heating installation according to a first embodiment of the present invention, FIG. 2 a schematic illustration of a heating installation according to a second embodiment of the invention, FIG. 3 a schematic illustration of a heating installation according to a third embodiment of the invention, FIG. 4 a schematic illustration of a heating installation according to a fourth embodiment of the invention, and FIG. 5 a schematic illustration of a heating installation according to a fifth embodiment of the invention.

Different embodiments of a heating installation 1 according to the invention are schematically illustrated in FIGS. 1-5. The illustrated heating installations are configured for heating a house or other building and tap hot-water associated therewith. However, the heating installation according to the invention may also be configured for satisfying other types of heating demands.

The heating installation 1 according to the invention comprises a first circuit C1 and a second circuit C2, each of which containing a liquid medium, such as for instance water. A circulation pump 2 is arranged in the first circuit C1 for circulating the medium in this circuit. A circulation pump 3 is also arranged in the second circuit C2 for circulating the medium in this circuit.

The heating installation 1 comprises a first heat pump 4 which is arranged for heating the medium in the first circuit C1, for instance by utilizing geothermal heat, ground heat and/or solar heat. The first heat pump 4 comprises an evaporator 4a, a condenser 4b, a compressor 4c and an expansion valve 4d, preferably an electromechanical expansion valve. By heat exchange with a medium in a circuit, here not shown, connected to the evaporator 4a, the working medium of the heat pump absorbs heat energy via the evaporator 4a. Work is added via the compressor 4c, whereby the pressure and the temperature of the working medium is increased. In the condenser 4c, heat energy is then emitted to the medium in the first circuit C1 by heat exchange and the working medium of the heat pump is then returned to the evaporator 4a via the expansion valve 4d, the pressure and the temperature of the working medium being lowered when passing the expansion valve. The heat pump 4 has its output side connected to the first circuit C1 so that heat exchange between the working medium of the heat pump and the medium in the first circuit C1 via the condenser 4b of the heat pump is possible.

An outlet 4e of the condenser 4b of the first heat pump is by means of a feeding conduit 5 connected to the inlet 6 of one or more heat emitting devices 7. These devices 7 are used for heating a further medium, in this case the air within the building, and are for instance constituted by conventional radiators to be operated with hot-water or other medium. The outlet 8 of the heat emitting devices is by means of a return conduit 9 connected to an inlet 4f of the condenser 4b of the first heat pump.

The heating installation 1 according to the invention further comprises a first heat exchanger 10 which is arranged in the second circuit C2 and connected between the condenser 4b and the expansion valve 4d of the first heat pump 4 in order to transfer heat from the working medium of the first heat pump 4 to the medium in the second circuit C2. According to the invention, the condensate of the first heat pump 4 is consequently utilized in order to supply heat to the medium in the second circuit C2. The first heat exchanger 10 constitutes a so-called subcooler of the first heat pump 4. The first heat exchanger 10 has a primary circuit through which the working medium of the first heat pump 4 is arranged to flow, and a secondary circuit which, via an inlet 10a and an outlet 10b of this secondary circuit, is connected to the second circuit C2 in order to allow the medium in the second circuit C2 to flow through the secondary circuit.

The heating installation 1 according to the invention further comprises:
- a second heat pump 11 arranged for heating a medium by absorbing heat energy from the medium in the second circuit C2;
- a second heat exchanger 12 which is arranged in the second circuit C2 in order to transfer heat from the medium in the second circuit C2 to water in a water supply line 13 that is intended to be heated in order to provide tap hot-water; and
- a third heat exchanger 14 which is arranged in the second circuit C2 in order to transfer heat from the medium in the second circuit C2 to the water in said water supply line 13.

The second heat pump 11 comprises an evaporator 11a, a condenser 11b, a compressor 11c and an expansion valve 11d, preferably an electromechanical expansion valve. By heat exchange with the medium in the second circuit C2 connected to the evaporator 11a, the working medium of the heat pump absorbs heat energy via the evaporator 11a. Work is added via the compressor 11c, whereby the pressure and the temperature of the working medium of the heat pump is increased. In the condenser 11d, heat energy is then emitted to another medium by heat exchange and the working medium of the heat pump is then returned to the evaporator 11a via the expansion valve 11d, the pressure and the temperature of the working medium being lowered when passing the expansion valve. The second heat pump 11 has its input side connected to the second circuit C2 so that heat exchange between the medium in the second circuit C2 and the working medium of the second heat pump is possible via the evaporator 11a of the second heat pump.

The second heat exchanger 12 has a primary circuit which, via an inlet 12a and an outlet 12b of this primary circuit, is connected to the second circuit C2 in order to allow the medium in the second circuit C2 to flow through the primary circuit, and a secondary circuit which, via an inlet 12c and an outlet 12d of this secondary circuit, is connected to the water supply line 13 in order to allow the water in the water supply line 13 to flow through the secondary circuit.

The third heat exchanger 14 has a primary circuit which, via an inlet 14a and an outlet 14b of this primary circuit, is connected to the second circuit C2 in order to allow the medium in the second circuit C2 to flow through the primary circuit, and a secondary circuit, which, via an inlet 14c and an outlet 14d of this secondary circuit, is connected to the water supply line 13 in order to allow the water in the water supply line 13 to flow through this secondary circuit.

The second heat exchanger 12 is connected to the second circuit C2 downstream of the second heat pump 11 as seen in a flow direction in the second circuit C2 from the above-mentioned outlet 10b of the first heat exchanger 10 to the above-mentioned inlet 10a of the first heat exchanger 10, whereas the third heat exchange 14 is connected to the second circuit C2 upstream of the second heat pump 11 as seen in said flow direction. The medium in the second circuit C2 absorbs heat when passing through the first heat exchanger 10 and will thereafter in turn, and while emitting heat, pass through the third heat exchanger 14, the evaporator 11a of the second heat pump and the second heat exchanger 12, whereupon the medium is directed back to the first heat exchanger 10.

In the embodiments illustrated in FIGS. 1-4, the first, second and third heat exchangers 10, 12, 14 and the evaporator 11a of the second heat pump 11 are arranged in series with each other in the second circuit C2, the second heat exchanger 12 being arranged between an outlet 11h of the evaporator 11a of the second heat pump and the inlet 10a of the first heat exchanger 10, whereas the third heat exchanger 14 is arranged between the outlet 10b of the first heat exchanger 10 and an inlet 11g of the evaporator 11a of the second heat pump.

In the embodiment illustrated in FIG. 5, a first accumulator tank 25, a second accumulator tank 26 and a third accumulator tank 27 are arranged in series with each other in the second circuit C2. In this case:
- the first accumulator tank 25 is connected to the inlet 14a of the primary circuit of the third heat exchanger via a feeding conduit 28 and to the outlet 14b of the primary circuit of the third heat exchanger via a return conduit 29, a circulation pump 30 being arranged in one of these conduits 28, 29;
- the second accumulator tank 26 is connected to the inlet 11g of the evaporator 11a of the second heat pump via a feeding conduit 31 and to the outlet 11h of the evaporator 11a of the second heat pump via a return conduit 32, a circulation pump 33 being arranged in one of these conduits 31, 32; and
- the third accumulator tank 27 is connected to the inlet 12a of the primary circuit of the second heat exchanger via a feeding conduit 34 and to the outlet 12b of the primary circuit of the second heat exchanger via a return conduit 35, a circulation pump 36 being arranged in one of these conduits 34, 35.

The accumulator tanks 25, 26, 27 constitute heat stores, wherein the heat energy of the medium stored in these accumulator tanks may be utilized in order to heat the tap hot-water via the second and third heat exchangers 12, 14 and the second heat pump 11. Hereby, it will be possible to heat the tap hot-water by utilizing the heat energy of the medium in the second circuit even in situations when the first heat pump 4 is temporarily out of operation.

The second and third heat exchangers 12, 14 are connected in series with each other in the water supply line 13, the second heat exchanger 12 being connected to the water supply line 13 upstream of the third heat exchanger 14 to thereby allow the second heat exchanger 12 to preheat the tap hot-water in a first step and the third heat exchanger 14 to preheat the tap hot-water in a subsequent second step. According to the invention, the condensate of the first heat pump 14 is consequently utilized in order to supply heat energy to the second and third heat exchangers 12, 14, which in their turn utilize this heat energy in order to achieve a preheating of the tap hot-water in two successive steps.

The water in the water supply line 13 will first pass through the secondary circuit of the second heat exchanger 12 and thereafter through the secondary circuit of the third heat exchanger 14. The water in the water supply line 13 is heated to a first temperature level when passing through the second heat exchanger 12, and the water is heated to a second temperature level, which is higher than said first temperature level, when thereafter passing through the third heat exchanger 14.

In all the illustrated embodiments, the second heat pump 11 is arranged to emit heat energy for final heating of the tap hot-water that has been preheated by the second and third heat exchangers 12, 14. The second heat pump 11 could also be used for other heating purposes.

Figure 2:
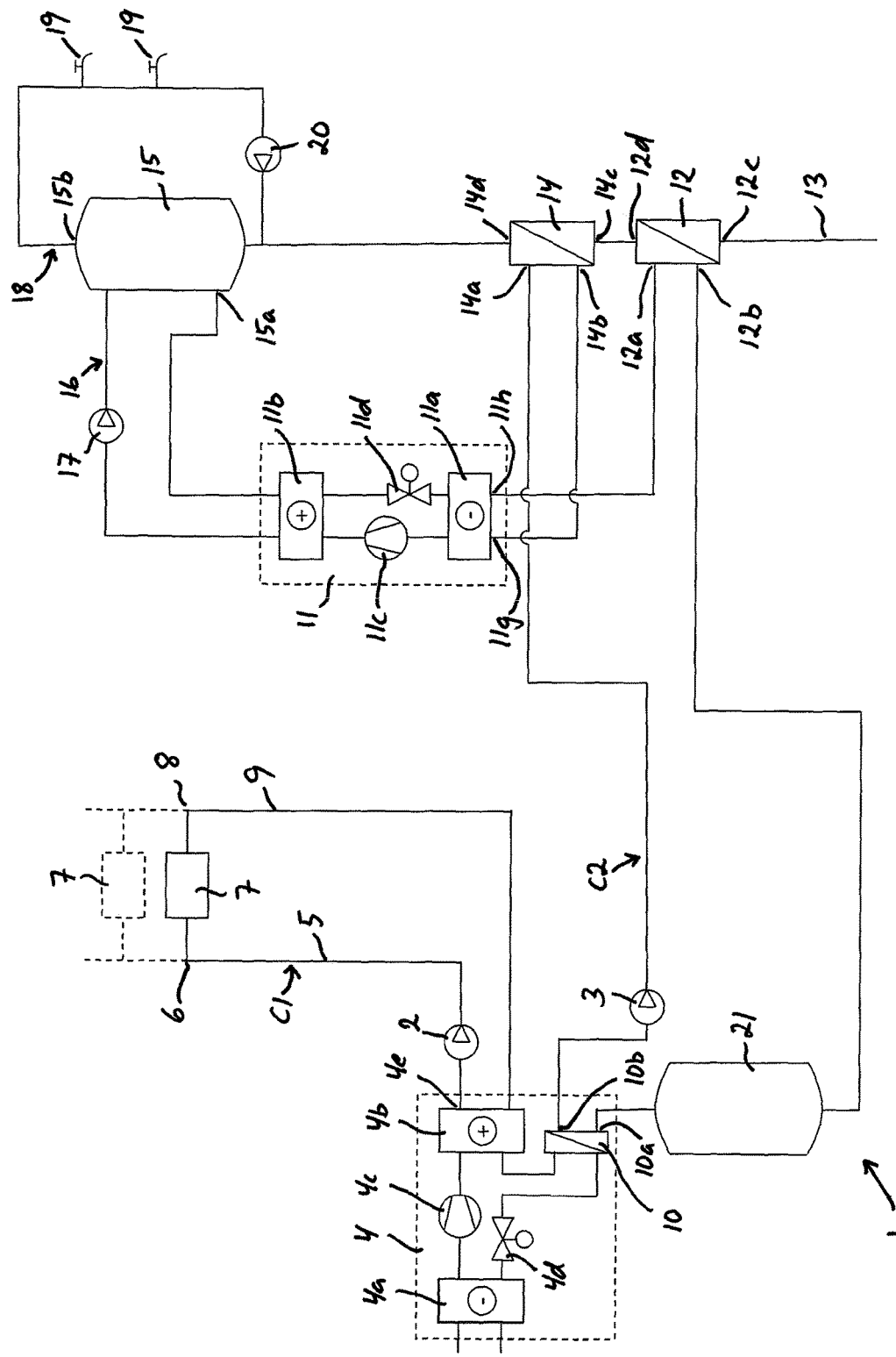

In the embodiments illustrated in FIGS. 1 and 2, the second heat pump 11 is arranged to achieve final heating of the tap hot-water by transferring heat from a working medium of the second heat pump 11 to preheated water that has passed through the second and third heat exchangers 12, 14. In this case, the heating installation 1 comprises an accumulator tank 15 which is connected to the water supply line 13 in order to accumulate the tap hot-water for final heating by the second heat pump 11. This accumulator tank 15 is consequently arranged in the water supply line 13 downstream of the second and third heat exchangers 12, 14.

Via a first tap hot-water circuit 16, water is directed from a first outlet 15a of the accumulator tank 15 to the condenser 11b of the second heat pump 11 and then back to the accumulator tank. Consequently, the second heat pump 11 has its output side connected to this first tap hot-water circuit 16 so that heat exchange between the working medium of the second heat pump 11 and the water in this tap hot-water circuit 16 is possible via the condenser 11b of the second heat pump. A circulation pump 17 is arranged in the first tap hot-water circuit 16 for circulating the medium in this circuit.

Via a second tap hot-water circuit 18, tap hot-water is directed from a second outlet 15b of the accumulator tank 15 to one or more tapping points 19, which for instance may be provided with hot-water taps. Tap hot-water that has passed the tapping points 19 without being tapped is directed back to the accumulator tank 15. A circulation pump 20 is arranged in the second tap hot-water circuit 18 for circulating the medium in this circuit.

Figure 3:
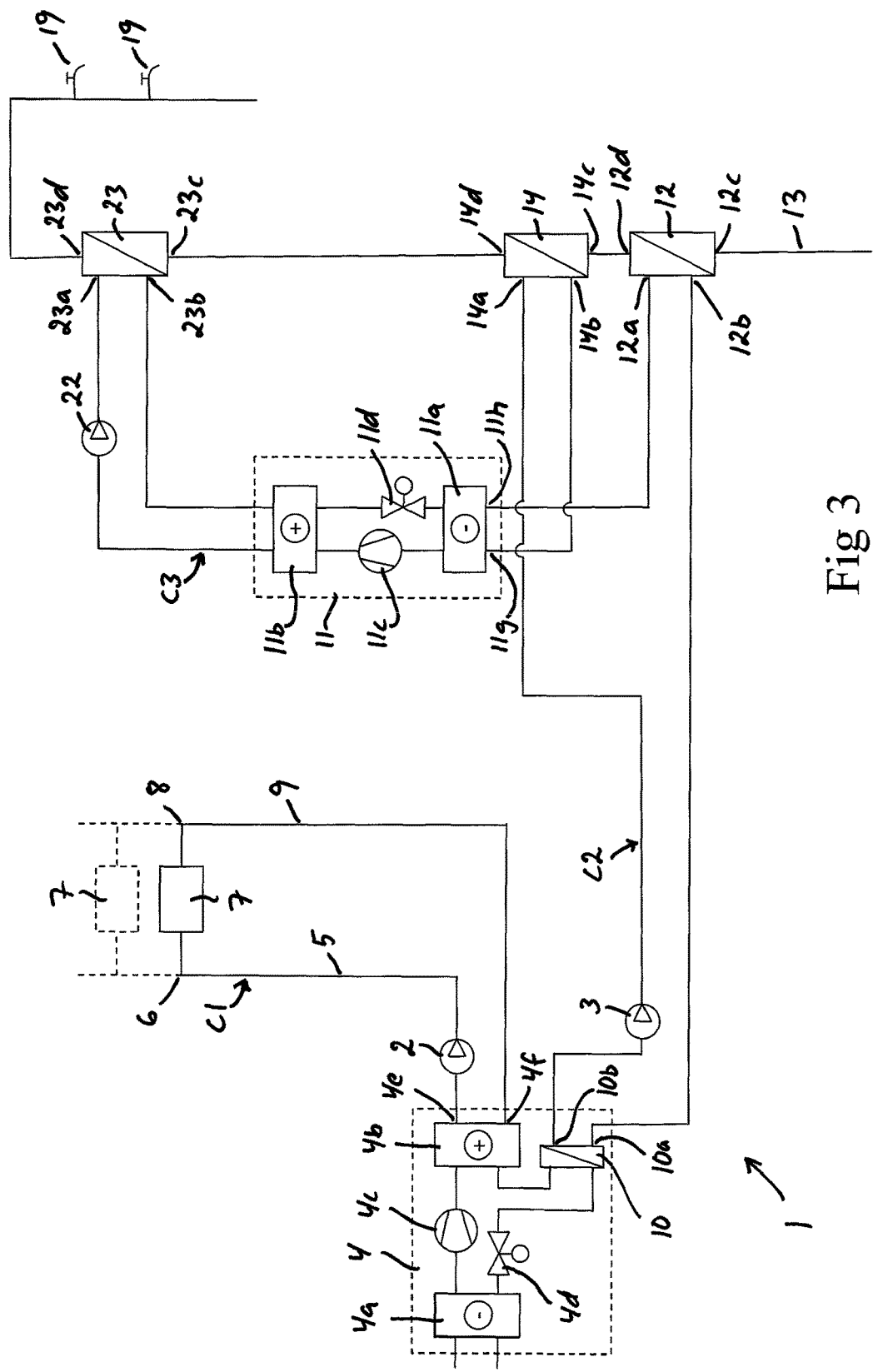
Figure 4:
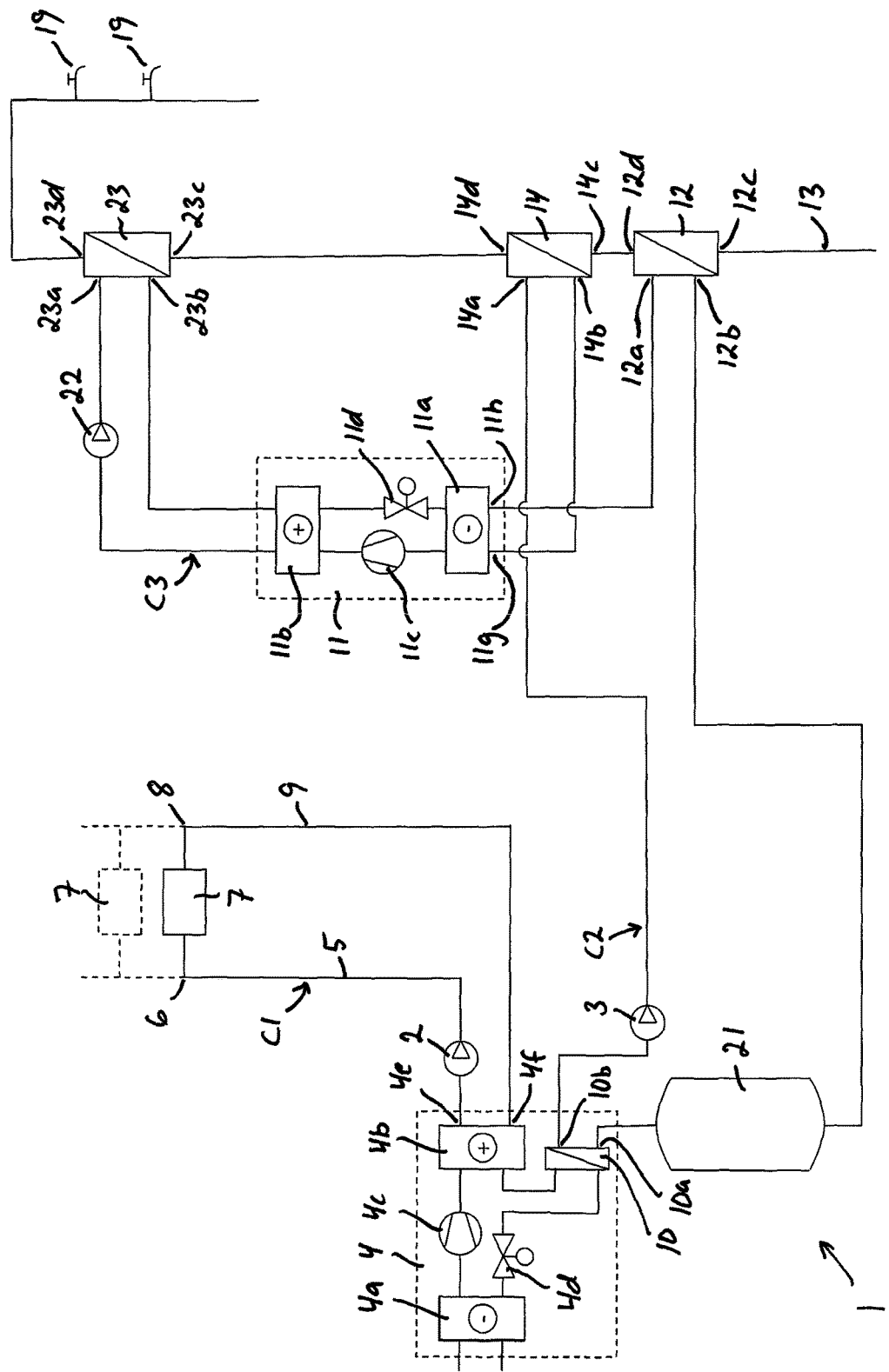

In the embodiments illustrated in FIGS. 3-5, the heating installation 1 comprises a third circuit C3 containing a medium, such as for instance water. A circulation pump 22 is arranged in the third circuit C3 for circulating the medium in this circuit. The second heat pump 11 is arranged to heat the medium in the third circuit C3 by absorbing heat energy from the medium in the second circuit C2. Consequently, the second heat pump 11 has its output side connected to the third circuit C3 so that heat exchange between the working medium of the second heat pump 11 and the medium in the third circuit C3 is possible via the condenser 11b of the second heat pump. A fourth heat exchanger 23 is arranged in the third circuit C3 for final heating of tap hot-water by transferring heat from the medium in the third circuit C3 to the water in the water supply line 13. The fourth heat exchanger 23 is connected to the water supply line 13 downstream of the second and third heat exchangers 12, 14. Consequently, the second heat pump 11 is arranged to achieve final heating of the tap hot-water via the third circuit C3 and the fourth heat exchanger 23 in the embodiments illustrated in FIGS. 3-5.

The fourth heat exchanger 23 has a primary circuit which, via an inlet 23a and an outlet 23b of this primary circuit, is connected to the third circuit C3 in order to allow the medium in the third circuit C3 to flow through the primary circuit, and a secondary circuit which, via an inlet 23c and an outlet 23d of this secondary circuit, is connected to the water supply line 13 in order to allow the water in the water supply line 13 to flow through the secondary circuit.

The embodiment illustrated in FIG. 2 corresponds to the embodiment illustrated in FIG. 1 and the embodiment illustrated in FIG. 4 corresponds to the embodiment illustrated in FIG. 3, with the exception that the heating installation 1 of the embodiments illustrated in FIGS. 2 and 4 comprises an accumulator tank 21 which is arranged in the second circuit C2 for accumulating the medium in this circuit. This accumulator tank 21 is arranged in the second circuit C2 in series with said first, second and third heat exchangers 10, 12, 14 and in series with the evaporator 11a of the second heat pump. The accumulator tank 21 arranged in the second circuit C2 constitutes a heat storage, wherein the heat energy of the medium stored in this accumulator tank may be utilized for heating the tap hot-water via the second and third heat exchangers 12, 14 and the second heat pump. Hereby, it will be possible to heat tap hot-water by utilizing the heat energy of the medium in the second circuit even in situations when the first heat pump 4 is temporarily out of operation. In the illustrated examples, the accumulator tank 21 is connected to the second circuit C2 between the outlet 12b of the second heat exchanger 12 and the inlet 10a of the first heat exchanger 10.

The invention is of course not in any way limited to the embodiments described above. On the contrary, many possibilities to modifications thereof should be apparent to a person skilled in the art without thereby deviating from the basic idea of the invention as defined in the appended claims.

The invention claimed is:

1. A heating installation comprising:
   a first circuit (C1) containing a medium;
   a second circuit (C2) containing a medium;
   a first heat pump (4) arranged for heating the medium in the first circuit (C1);
   a first heat exchanger (10) which is arranged in the second circuit (C2) and which is connected between a condenser (4b) and an expansion valve (4d) of the first heat pump (4) to transfer heat from a working medium flowing through the first heat pump (4) to the medium in the second circuit (C2);
   a second heat pump (11) arranged for heating a medium by absorbing heat energy from the medium in the second circuit (C2);
   a second heat exchanger (12) which is arranged in the second circuit (C2) to transfer heat from the medium in the second circuit (C2) to water in a water supply line (13) flowing through the second heat exchanger (12) and to be heated to provide tap hot-water, said second heat exchanger (12) being positioned in the second circuit (C2) downstream of the second heat pump (11) as seen in a flow direction from an outlet (10b) of the first heat exchanger (10) to an inlet (10a) of the first heat exchanger (10); and
   a third heat exchanger (14) arranged in the second circuit (C2) to transfer heat from the medium in the second circuit (C2) to the water flowing in said water supply line (13), said third heat exchanger (14) being positioned in the second circuit (C2) upstream of the second heat pump (11) as seen in said flow direction; wherein
   said second and third heat exchangers (12, 14) are arranged in series with each other in both said second circuit (C2) and said water supply line (13), and
   the second heat exchanger (12) is arranged in the water supply line (13) upstream of the third heat exchanger (14) to thereby preheat the tap hot-water in a first step and with the third heat exchanger (14) pre-heating the tap hot-water in a subsequent second step, with said water supply line (13) passing through both said second and third heat exchangers (12, 14) in only a single direction.

2. The heating installation according to claim 1, wherein the second heat pump (11) is arranged to emit heat energy for final heating of the tap hot-water.

3. The heating installation according to claim 2, wherein the heating installation (1) comprises a third circuit (C3) containing the medium heated by the second heat pump (11);
   and
   the heating installation (1) comprises a fourth heat exchanger (23) which is arranged in the third circuit (C3) for final heating of the tap hot-water by transferring heat from the medium in the third circuit (C3) to the water in said water supply line (13), the fourth heat exchanger (23) being connected to the water supply line (13) downstream of the third heat ex-changer (14).

4. The heating installation according to claim 3, wherein the second heat pump (11) has its output side connected to the third circuit (C3) so that heat exchange between a working medium of the second heat pump (11) and the medium in the third circuit (C3) is possible via a condenser (11b) of the second heat pump (11).

5. The heating installation according to claim 2, wherein the second heat pump (11) is arranged to achieve final heating of the tap hot-water by transferring heat from a working medium of the second heat pump (11) to the water preheated by said second and third heat exchangers (12, 14).

6. The heating installation according to claim 5, wherein the heating installation (1) comprises an accumulator tank (15) for accumulating the tap hot-water final-heated by the second heat pump (11).

7. The heating installation according to claim 1, wherein at least one accumulator tank (21; 25, 26, 27) is arranged in the second circuit (C2) for accumulating the medium in the second circuit.

8. The heating installation according to claim 1, wherein the second heat exchanger (12) is connected to the second circuit (C2) between an outlet (11h) of the second heat pump (11) and the inlet (10a) of the first heat exchanger (10).

9. The heating installation according to claim 1, wherein the third heat exchanger (14) is connected to the second circuit (C2) between an outlet (10b) of the first heat exchanger (10) and an inlet (11g) of the second heat pump (11).

10. The heating installation according to claim 1, wherein the second heat pump (11) has its input side connected to the second circuit (C2) so that heat exchange between the medium in the second circuit (C2) and a working medium of the second heat pump (11) is possible via an evaporator (11a) of the second heat pump (11).

11. The heating installation according to claim 2, wherein at least one accumulator tank (21; 25, 26, 27) is arranged in the second circuit (C2) for accumulating the medium in the second circuit.

12. The heating installation according to claim 3, wherein at least one accumulator tank (21; 25, 26, 27) is arranged in the second circuit (C2) for accumulating the medium in the second circuit.

13. The heating installation according to claim 4, wherein at least one accumulator tank (21; 25, 26, 27) is arranged in the second circuit (C2) for accumulating the medium in the second circuit.

14. The heating installation according to claim 5, wherein at least one accumulator tank (21; 25, 26, 27) is arranged in the second circuit (C2) for accumulating the medium in the second circuit.

15. The heating installation according to claim 6, wherein at least one accumulator tank (21; 25, 26, 27) is arranged in the second circuit (C2) for accumulating the medium in the second circuit.

16. The heating installation according to claim 15, wherein the second heat exchanger (12) is connected to the second circuit (C2) between an outlet (11h) of the second heat pump (11) and the inlet (10a) of the first heat exchanger (10).

17. The heating installation according to claim 14, wherein the second heat exchanger (12) is connected to the second circuit (C2) between an outlet (11h) of the second heat pump (11) and the inlet (10a) of the first heat exchanger (10).

18. The heating installation according to claim 13, wherein the second heat exchanger (12) is connected to the second circuit (C2) between an outlet (11h) of the second heat pump (11) and the inlet (10a) of the first heat exchanger (10).

19. The heating installation according to claim 12, wherein the second heat exchanger (12) is connected to the second circuit (C2) between an outlet (11h) of the second heat pump (11) and the inlet (10a) of the first heat exchanger (10).

20. The heating installation according to claim 1, wherein heat transfer from the working medium flowing through the first heat pump (4) to the medium circulating through the first circuit (C1) takes place in the condenser (4b).

* * * * *